United States Patent Office 2,925,972
Patented Feb. 23, 1960

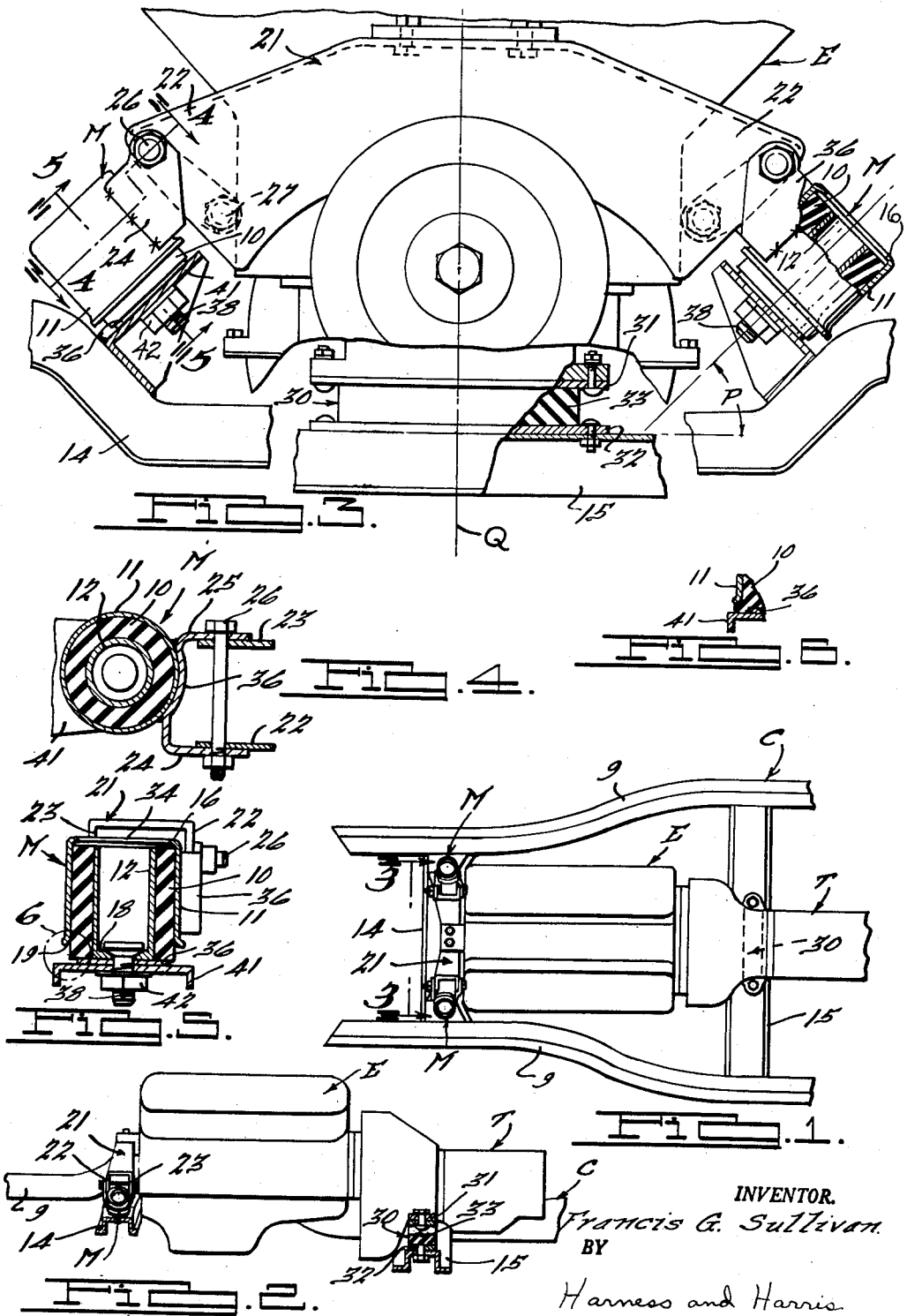

2,925,972
SLIP FRICTION VIBRATION DAMPING MOUNT

Francis G. Sullivan, Birmingham, Mich., assignor to Chrysler Corporation, Highland Park, Mich., a corporation of Delaware Application November 16, 1956, Serial No. 622,579

1 Claim. (Cl. 248—9)

This invention relates to resilient, vibration damping, mounting means for suspended, movable objects and particularly to engine mounts for motor vehicles.

It is a primary object of this invention to provide a vibration damping, noise reducing, engine mount that is simple to manufacture and install, economical to produce, highly resistant to wear or deterioration, and superior in operation to existing mounts of this general type.

It is a further object of this invention to provide a resilient, plunger-type, engine mount wherein the resilient material thereof is free to move relative to other associated portions of the mount such that sliding friction can be used to supplement the shear and compressive effects that are developed in the resilient material during its vibration damping action.

Other objects and advantages of this invention will become readily apparent from a reading of the following description and a consideration of the related drawings wherein:

Fig. 1 is a top plan view of the engine supporting end of a motor vehicle chassis frame having engine mounts embodying this invention;

Fig. 2 is a side elevational view, partly in section, of the engine supporting chassis frame shown in Fig. 1;

Fig. 3 is an enlarged, fragmentary, front end elevational view, partly in section, of the Fig. 1 structure, the view being taken as indicated by the arrows 3—3 of Fig. 1;

Fig. 4 is a fragmentary sectional elevational view taken along the line 4—4 of Fig. 3 looking in the direction of the arrows;

Fig. 5 is another fragmentary sectional elevational view taken along the line 5—5 of Fig. 3 looking in the direction of the arrows; and Fig. 6 is an enlarged, fragmentary, sectional elevational view of that portion of the engine mount included within the circle 6 of Fig. 5, the view being taken when the mount is under load to show the deformation of portions of the resilient material of the mount.

Engine mounts of the disclosed type have been found to reduce body shake, reduce engine noise, and provide less fore-and-aft engine movement than resilient mounts heretofore in use. The benefits received from these new shear-type, spool-shaped, resilient, front end engine mountings are due in part to the fact that the resilient material of the mountings is not bonded to its associated members but instead is free for limited sliding movement with respect thereto. Where previous bonded resilient mountings used the rubber-like material thereof in shear and in compression to isolate the engine from the chassis frame, this new type of mounting incorporates the additional principle of friction damping, resulting from sliding friction of the resilient material on its adjacent mount members, to aid in reducing the transmission of engine noise and vibration.

These novel motor mountings in general consist of a spool or cylinder of rubber-like material 10 concentrically arranged between a pair of encircling, contiguous, outside and inside metal shells 11 and 12. The outer shell 11 is attached to the engine block E and the inner shell 12 is attached to a chassis frame cross member 14. The spool of rubber-like material 10 is engaged with but is not bonded to either shell 11, 12 therefore it is free to slidably move within the confines of the shells 11, 12.

Low-speed engine movement, which occurs at engine idle speed is effectively damped by this type of mount due to the combined action of the rubber-like material 10 acting in shear, in compression, and in friction resulting from the slippage of the rubber-like spool 10 relative to the metal shells 11, 12. The upper end 16 of the outer shell 11 is rolled over the upper end of the outer periphery of the rubber-like spool 10 and the lower end 18 of the inner shell 12 has a large spool retaining washer 19 attached thereto to prevent separation of the several parts of the mounting. High-frequency engine noise and vibration, that might develop at high engine speeds, is also effectively isolated by this resilient mount wherein the resilient material thereof acts in compression, shear and also provides friction damping. Fore-and-aft movement of the associated engine is restricted since this engine motion places the rubber-like material 10 in compression.

Not only is this unbonded motor mount more efficient in operation than the conventional bonded resilient mount but it is thought to be rather obvious that the unbonded mount is cheaper to produce. No bonding is required and thus the cost of this operation is eliminated. Also, because a welding operation destroys a bond in the area adjacent the weld, it has been necessary to do any welding of studs or flanges on the mount before the bonding operation and this was often inconvenient and costly. With the unbonded mount welding can be done at any time. Furthermore, the manufacture and assembly of the unbonded mount can be done by unskilled labor along an assembly line whereas the bonded type of mount had to be manufactured in a plant having vulcanizing equipment and the like. The unbonded mount permits fabrication of the mount by the motor vehicle manufacturer whereas the bonded type of mount was normally purchased from a rubber company or the like that was set up to accomplish the bonding operation. The economics of the situation is such as to make the unbonded mount preferred to the bonded type of mount particularly where the performance of the unbonded mount is superior to the bonded type of mount.

Fig. 1 of the drawings shows a motor supporting portion of a vehicle chassis frame C that includes a pair of spaced side rails 9, 9 that are interconnected by frame cross members 14 and 15. Mounted on the frame cross members 14, 15 between the side rails 9, 9 is an engine E which in the case shown is of the V-type. The front end of the engine E is connected to the front frame cross member 14 by a pair of spaced engine vibration damping mounts M, M. Front motor mounts M, which are subsequently described in detail, involve the invention herein disclosed.

The engine block E has connected thereto at the front end a channel-shaped front end supporting member 21. This supporting member 21 provides at each side of the engine E a pair of spaced, depending, flanges 22, 23 (see Fig. 4). Engine support flanges 22, 23 have the supporting flanges 24, 25 of the mounts M connected thereto by the bolts 26, 27. It will be noted that the upper bolt 26 is connected to each of the mount flanges 24, 25 whereas the lower bolt 27 is connected to only the rearwardly positioned mount flange 25. This specific arrangement may be varied to suit the particular design of the engine and chassis frame that are connected by the mounts M.

The rear end of the engine E has the transmission structure T rigidly fixed thereto. The transmission structure T, as well as the rear end portion of the engine E, are supported on the chassis frame rear cross member 15 by a resilient, sandwich-type, engine mount 30. Rear engine mount 30 (see Fig. 3) is more or less conventional and comprises a plate 31 bolted to the transmission structure T, a plate 32 bolted to the frame cross member 15, and an intermediate rubber-like pad 33 positioned between and bonded to the plates 31, 32.

The front engine mounts M, which involve this invention, are identical so only one will be described in detail. Mount M comprises an outer metal tubular shell 11 that is preferably of cylindrical shape. Shell 11 can initially be a cylindrical metal cup and then the closed end of the cup can have a disc 36 punched therefrom to provide the opening 34 at the upper end of the shell (see Fig. 5). The disc 36 that is punched from the cup-like shell 10 can be used as the washer 36 (see Fig. 5) for mounting of the rubber sleeve 10 within the shell 11. It will be noted that the edge portion 16 at the upper end of the shell 11 extends radially inwardly so that it provides portions that overlie the top of the rubber sleeve 10 and prevent longitudinal movement of the resilient sleeve 10 through the open upper end 34 of the shell 11. The radially inwardly extending portion 16 of outer shell 11 is so designed that it permits deformation of the upper end of resilient sleeve 10 when it is subjected to compressive forces. From Fig. 5 it will be noted that the upper edge 16 of the outer shell 11 overlies only the outer peripheral portion of the top of the rubber sleeve 10. Accordingly, when there is relative axial movement between sleeves 10, 11 the lip edge 16 permits deformation of the rubber sleeve 10 such that both compressive and shear stresses are set up in the rubber sleeve 10. The lower end edge 19 of the outer shell 11 is flared outwardly as clearly shown in Fig. 6. This flaring of the lower edge of the outer shell 11 prevents the lower edge of the shell 11 from cutting into the rubber-like sleeve 10 when compressive forces applied to rubber-like sleeve 10 causes its deformation. Flaring of the lower edge of outer shell 11 also has some softening effect on the mount M.

Welded or otherwise fastened to the outer side of the outer shell 11 is the support bracket 36 that carries the spaced apart support flanges 24, 25. The support flanges 24 and 25 are pierced by one or more apertures that are adapted to receive mounting bolts 26 and/or 27 for connecting the outer shell 11 to the engine block E.

The rubber-like resilient sleeve 10 that is mounted within the outer shell 11 is of such size that it fits snugly within the outer shell 11 yet is capable of limited sliding movement along the inner cylindrical surfaces of the outer shell 11. Resilient sleeve 10 is of sufficient thickness to provide a compressible mass that will dissipate engine vibration and noise in both compression and shear as well as by slipping friction of the sleeve 10 within the shell 11.

Concentrically mounted within the axial bore through the resilient sleeve 10 is an inner metal shell member 12. Inner shell 12 is essentially a thin-walled cup that has a bolt-like connector 38 fixed to and piercing its lower closed end 18. Mounted on the downwardly projecting stud portion of bolt connector 38 is the washer 36. Washer 36 is of such a diameter that it overlaps a portion of the bottom of the resilient sleeve 10 to prevent disengagement of the sleeve 10 from the concentric shells 11, 12. Washer 36 will permit a deformation of the sleeve 10 adjacent the bottom end thereof when the sleve 10 is placed under compression. The outside diameter of inner metal shell 12 is such that it snugly fits the axial bore in the resilient sleeve 10 yet permits sliding movement therebetween.

The chassis frame front cross member 14 is provided with a mounting bracket 41 at each side for receiving each of the front engine mounts M. Bracket 41 has a bore therein to receive the stud of connector 38 of mount M. A nut 42 fixedly connects the mount stud 38 to the chassis frame bracket 41.

The unbonded resilient sleeve mounts M hereinbefore described permit some limited slipping of the rubber-like sleeve 10 relative to the inner and outer metal shells 11, 12 when certain types of forces are applied to the mounts. Accordingly, friction damping develops during this slipping movement that acts in series with the resilient sleeve 10 to assist in damping engine vibration and nose. The mounts M thus permit the most efficient use of the rubber-like material 10 for they add friction damping to the shear and compression action of the resilient material of the mounts. It is also thought to be obvious that when forces are applied to the mounts M that act in a direction extending axially of the rubber-like sleeve 10, that then the resilient material 10 of the mount can be deformed by shear and compression to a limited degree so that it can provide the most efficient vibration and noise damping action.

From an inspection of Fig. 3 of the drawings it will be noted that the front mounts M extend at an angle P to the horizontal and converge downwardly towards the plane Q that includes the engine roll axis. Because of this mount angularity it is the upper or top half of the resilient sleeves 10 that carry the radially acting compressive loads of the engine E. The lower or under half portion of the resilient sleeves 10 is substantially unloaded by radially acting static engine loads. A modified form of this invention to show an even more efficient use of the resilient sleeves 10 in a mount of this type is shown in the co-pending application of Frederick C. Aebersold, Serial No. 623,238, filed November 19, 1956.

I claim:

In a motor vehicle, a power plant, a chassis frame, and means to resiliently mount said power plant on said chassis frame comprising a chassis frame supported, resilient, mount disposed centrally of the width of the power plant at one end portion thereof and a pair of transversely spaced, chassis frame supported, resilient mounts for transversely spaced parts of the other end portion of the power plant, said transversely spaced pair of resilient mounts each comprising an open-ended, tubular, outer shell member connected to said power plant and arranged with their longitudinal axes extending in a vertical plane at an acute angle to a horizontal plane and converging towards the longitudinal axes of the power plant, said outer shell member having radially inwardly directed abutment means at its upper end extending across a portion of the open upper end thereof, a resilient, rubber-like, tubular member mounted concentrically within the outer shell member having portions of its outer side surface contiguous to and slidable along the inner side surface of the outer shell member, an inner plunger member mounted concentrically within the resilient tubular member with portions of its outer side surface contiguous to and slidable along the inner side surface of the resilient tubular member, and abutment means carried by the inner plunger member extending across a portion of the open lower end of the outer shell member to restrict relative longitudinal movement between the resilient tubular member and the inner plunger member, said abutment means cooperating with said resilient, rubber-like, tubular member to develop shear and friction damping forces in the rubber-like tubular element during relative axial movement between the rubber-like tubular element and the outer shell member and inner plunger member.

References Cited in the file of this patent

UNITED STATES PATENTS

| 2,068,994 | Lord | Jan. 26, 1937 |
| 2,468,900 | Thiry | May 3, 1949 |
| 2,658,710 | Titus | Nov. 10, 1953 |

FOREIGN PATENTS

| 475,153 | Great Britain | Nov. 8, 1937 |
| 486,333 | Great Britain | June 2, 1938 |
| 768,640 | France | May 22, 1933 |